United States Patent
Haramoto

(10) Patent No.: US 7,422,702 B2
(45) Date of Patent: Sep. 9, 2008

(54) BENZENE DERIVATIVE HAVING LONG, LINEAR CONJUGATED STRUCTURE, PROCESS FOR PRODUCING BENZENE DERIVATIVE, AND LIQUID-CRYSTAL MATERIAL

(75) Inventor: Yuichiro Haramoto, Kofu (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 113 days.

(21) Appl. No.: 10/548,386

(22) PCT Filed: Mar. 22, 2004

(86) PCT No.: PCT/US2004/003857

§ 371 (c)(1), (2), (4) Date: Aug. 7, 2006

(87) PCT Pub. No.: WO2004/085359

PCT Pub. Date: Oct. 7, 2004

(65) Prior Publication Data

US 2006/0278848 A1 Dec. 14, 2006

(30) Foreign Application Priority Data

Mar. 24, 2003 (JP) .............................. 2003-079740

(51) Int. Cl.
*C09K 19/16* (2006.01)
*C07C 43/215* (2006.01)
*C07C 41/30* (2006.01)

(52) U.S. Cl. .................. 252/299.01; 568/646; 568/648; 568/654; 568/660

(58) Field of Classification Search ............ 252/299.01; 568/631, 646, 648, 654, 660
See application file for complete search history.

(56) References Cited

U.S. PATENT DOCUMENTS 7,371,887 B2 * 5/2008 Stupp et al. .................... 560/57

FOREIGN PATENT DOCUMENTS

JP 2004-6271 1/2004

OTHER PUBLICATIONS

Suzuki et al., "Polycondensation Catalyzed by a Palladium Comples. 2. Synthesis and Characterization of Main-Chain Type Liquid Crystalline Polymers Having Distyrylbenzene Mesogenic Groups", Marcomolecules 1990, 23, 1574-1579.*
English abstract for JP 2004-6271.*
H. Ndayikengurukiye.; "Alkoxylated p-phenylenevinylene oligomers: synthesis and spectroscopic and electrochemical properties", Tetrahedron, 1997, vol. 53, No. 40, pp. 13811-13828.
A. Watakabe et al.; Molecular design and monolayer stability of oligo (phenylenevinylene) derivatives, Colloids and Surfaces, A: Physico Chemical and Engineering Aspects, 1994, vol. 87, No. 2, pp. 101-116.

* cited by examiner

*Primary Examiner*—Shean C Wu
(74) *Attorney, Agent, or Firm*—Westerman, Hattori, Daniels & Adrian, LLP.

(57) ABSTRACT

The present invention provides, in a method for transporting charge using the molecular orientation in a liquid-crystalline state, a novel benzene derivative having a long, linear conjugated structure expected to have satisfactory charge-transport properties without photoexcitation, a process for producing the benzene derivative, and a liquid-crystal material including the benzene derivative. The benzene derivative having a long, linear conjugated structure is represented by general formula (1):

(1)

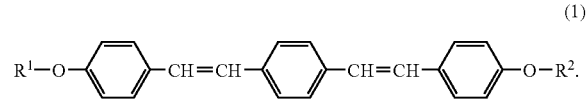

3 Claims, No Drawings

BENZENE DERIVATIVE HAVING LONG, LINEAR CONJUGATED STRUCTURE, PROCESS FOR PRODUCING BENZENE DERIVATIVE, AND LIQUID-CRYSTAL MATERIAL

TECHNICAL FIELD

The present invention relates to a novel benzene derivative having a long, linear conjugated structure, the benzene derivative being useful as a charge-transport material used in, for example, optical sensors, organic electroluminescent elements (EL elements), photoconductors, spatial modulators, thin-film transistors, charge-transport substances for electrophotographic photoreceptors, photolithographic materials, solar cells, nonlinear optical materials, organic semiconductor capacitors, or other sensors. The present invention also relates to a liquid-crystal material and a process for producing the benzene derivative.

BACKGROUND ART

In recent years, organic electroluminescent elements using organic materials as hole-transport materials or charge-transport materials constituting the electroluminescent elements have been intensively studied.

As such charge-transport materials, for example, anthracene derivatives, anthraquinoline derivatives, imidazole derivatives, styryl derivatives, hydrazone derivatives, triphenylamine compounds, poly(N-vinylcarbazoles), and oxadiazoles are known.

Liquid-crystal compounds have been used as materials for displays and applied to various devices, such as clocks, desktop electronic calculators, television sets, personal computers, and cellular phones. The liquid-crystal materials are classified into thermotropic liquid crystals (liquid crystals in which transitions depend on temperature) and lyotropic liquid crystals (liquid crystals in which transitions depend on concentration) on the basis of the mechanisms of phase transitions. From the standpoint of molecular arrangements, these liquid crystals are classified into three groups: smectic liquid crystals, nematic liquid crystals, and cholesteric liquid crystals. The liquid crystals are also known as anisotropic liquids and exhibit optical anisotropy similarly to optically uniaxial crystals. Observation using an orthoscope is usually performed between crossed Nicols, and is useful for the identification of types of liquid crystals and for the determination of the transition temperatures of liquid-crystal phases. The smectic liquid crystals are classified into A, B, C, D, E, F, and G on the basis of characteristic birefringent optical patterns observed with the orthoscope.

Hanna et al. have found that liquid-crystal compounds having smectic phases are capable of transporting charges and have proposed charge-transport materials using the liquid crystal compounds. They have proposed, for example, a liquid-crystalline charge-transport material exhibiting smectic liquid crystallinity and having a reduction potential of −0.3 to −0.6 (V vs. SEC) with reference to a standard calomel electrode (SCE) (Japanese Unexamined Patent Application Publication No. 09-316442); a liquid-crystalline charge-transport material including a liquid crystalline compound exhibiting a smectic phase having self-orientation properties and a predetermined amount of fullerene C70 having a sensitizing effect (Japanese Unexamined Patent Application Publication No. 11-162648); a polymer membrane in which a liquid-crystalline charge-transport material is dispersed in the polymer matrix, in other words, a polymer membrane in which a liquid-crystalline compound exhibiting a smectic phase is dispersed (Japanese Unexamined Patent Application Publication No. 11-172118); a liquid-crystalline charge-transport material including a mixture containing a smectic liquid-crystalline compound (Japanese Unexamined Patent Application Publication No. 11-199871); a liquid-crystalline charge-transport material having smectic liquid crystallinity and having an electron mobility or hole mobility of $1 \times 10^{-5}$ $cm^2/v \cdot s$ or more (Japanese Unexamined Patent Application Publication No. 10-312711); and a liquid-crystalline charge-transport material including a smectic liquid crystalline compound having, in one molecule, a functional group capable of forming a new intermolecular or intramolecular bond and a functional group capable of transporting a hole and/or electron (Japanese Unexamined Patent Application Publication No. 11-209761).

Smectic liquid-crystalline compounds disclosed in the above-described Patent Documents include smectic liquid-crystalline compounds each having a 6-π-electron aromatic ring such as a benzene ring, a pyridine ring, a pyrimidine ring, a pyridazine ring, a pyrazine ring, or a tropolone ring; smectic liquid-crystalline compounds each having a 10-π-electron aromatic ring such as a naphthalene ring, an azulene ring, a benzofuran ring, an indole ring, an indazole ring, a benzothiazole ring, a benzoxazole ring, a benzimidazole ring, a quinoline ring, an isoquinoline ring, a quinazoline ring, or a quinoxaline ring; and smectic liquid-crystalline compounds each having a 14-π-electron aromatic ring such as a phenanthrene ring, or an anthracene ring. In these compounds, charges are transported in a smectic-A phase. However, the above-described method for transporting charges requires photoexcitation. Furthermore, conductivity is $10^{-13}$ s/cm without photoexcitation and $10^{-11}$ s/cm in a photoexcited state. The conductivity values are the same levels as those of an insulating material.

DISCLOSURE OF INVENTION

The present inventors have proposed a method for transporting charge by applying a voltage to a liquid-crystalline compound in a smectic-B phase or in a solid state due to phase transition from the smectic-B phase (Japanese Unexamined Patent Application Publication No. 2001-351786).

The present invention has been accomplished in view of such known techniques. It is an object of the present invention to provide, in a method for transporting charge using the molecular orientation in a liquid-crystalline state, a novel benzene derivative having a long, linear conjugated structure expected to have satisfactory charge-transport properties without photoexcitation, a process for producing the benzene derivative, and a liquid-crystal material including the benzene derivative.

A first aspect of the present invention provides a benzene derivative having a long, linear conjugated structure represented by general formula (1):

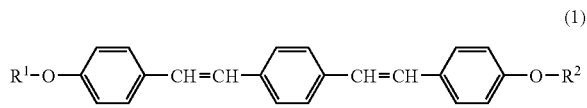

(1)

wherein $R^1$ and $R^2$ each represent a straight or branched alkyl group, an alkoxy group, or a group having an unsaturated bond represented by general formula (2):

(2)

(wherein $R^3$ represents a hydrogen atom or a methyl group, and B represents an alkylene group, —CO—O—$(CH_2)n$—, —$C_6H_4$—$CH_2$—, or —CO—), with the proviso that $R^1$ and $R^2$ are not the same group.

A second aspect of the present invention provides a process for producing a benzene derivative having a long, linear conjugated structure represented by general formula (1):

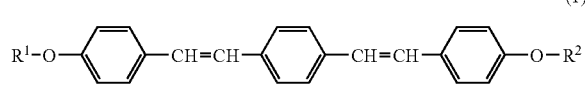
(1)

(wherein $R^1$ and $R^2$ are the same as described above, with the proviso that $R^1$ and $R^2$ are not the same group), the process including: allowing a benzaldehyde derivative represented by general formula (3):

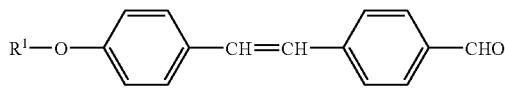
(3)

(wherein $R^1$ is the same as described above), to react with a phosphonium salt represented by (4):

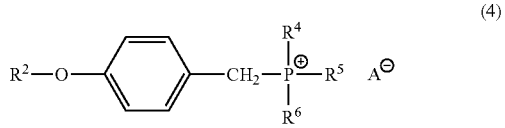
(4)

(wherein $R^2$ is the same as described above, $R^4$, $R^5$, and $R^6$ are each a monovalent organic group, and A represents a halogen atom), in the presence of a base.

A third aspect of the present invention provides a liquid-crystal material including a benzene derivative having a long, linear conjugated structure represented by general formula (1) described above or a compound derived from the benzene derivative.

BEST MODE FOR CARRYING OUT THE INVENTION

The present invention will be described in detail below.

A novel compound provided by the present invention is a benzene derivative having a long, linear conjugated structure represented by general formula (1).

$R^1$ and $R^2$ in the benzene derivative having a long, linear conjugated structure represented by general formula (1) each represent a straight or branched alkyl group, an alkoxy group, or a group having an unsaturated bond represented by general formula (2), with the proviso that $R^1$ and $R^2$ are not the same group.

The alkyl group has 1 to 18 carbon atoms. Specific examples thereof include a methyl group, an ethyl group, a butyl group, a pentyl group, a hexyl group, an octyl group, a dodecyl group, pentadecyl group, and an octadecyl group. Among these, an alkyl group having 6 to 18 carbon atoms is particularly preferable. Furthermore, when the alkyl group is a branched alkyl group represented by general formula: $CH_3$—$(CH_2)_n$—$CH(CH_3)$—$(CH_2)_m$—$CH_2$—(wherein n represents 0 to 7, and m represents 0 to 7), the solubility of the benzene derivative can be improved.

The alkoxy group is represented by general formula: $C_nH_{2n+1}O$, wherein n is preferably 1 to 18 and particularly preferably 6 to 18.

$R^3$ in the group having an unsaturated bond represented by the general formula (2) represents a hydrogen atom or a methyl group. B represents an alkylene group, —CO—O—$(CH_2)n$—, —$C_6H_4$—$CH_2$—, or —CO—. The alkylene group may be straight or branched chain and preferably has 1 to 18 carbon atoms. Specific examples thereof include a methylene group, an ethylene group, a trimethylene group, a tetramethylene group, a pentamethylene group, an ethylethylene group, a propylene group, a butylene group, a hexylene group, an octadecylene group, a nonylene group, a decylene group, and a dodecylene group. Furthermore, n in —CO—O—$(CH_2)_n$—is particularly preferably 1 to 18.

In the benzene derivative having a long, linear conjugated structure according to the present invention, it is particularly preferred that $R^1$ in the general formula (1) represent a group having an unsaturated bond represented by general formula (2), and $R^2$ represent an alkyl group. In this case, polymerization can be performed. Furthermore, when polymerization is performed, the resulting polymer can be used as a charge-transport material effectively using molecular orientation of the compound in a liquid-crystalline state.

In the present invention, the benzene derivative having a long, linear conjugated structure represented by general formula (1) is a novel compound. With respect to a conformation, the benzene derivative may be a cis-isomer, a trans-isomer, or a mixture of cis- and trans-isomers.

A process for producing the benzene derivative having a long, linear conjugated structure represented by general formula (1) will be described below.

The process for producing the benzene derivative having a long, linear conjugated structure according to the present invention includes the reaction shown in reaction formula (1):

reaction formula (1)

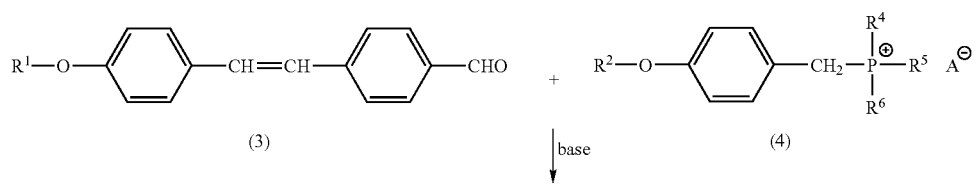

(3)    base    (4)

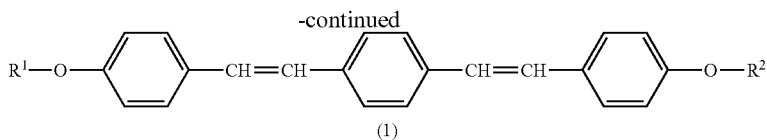

(wherein $R^1$, $R^2$, $R^4$, $R^5$, $R^6$, and A are the same as described above).

The benzaldehyde derivative, which is a first material used in the first step, represented by general formula (3) can be prepared by performing steps A-1 to A-4 according to reaction scheme (2):

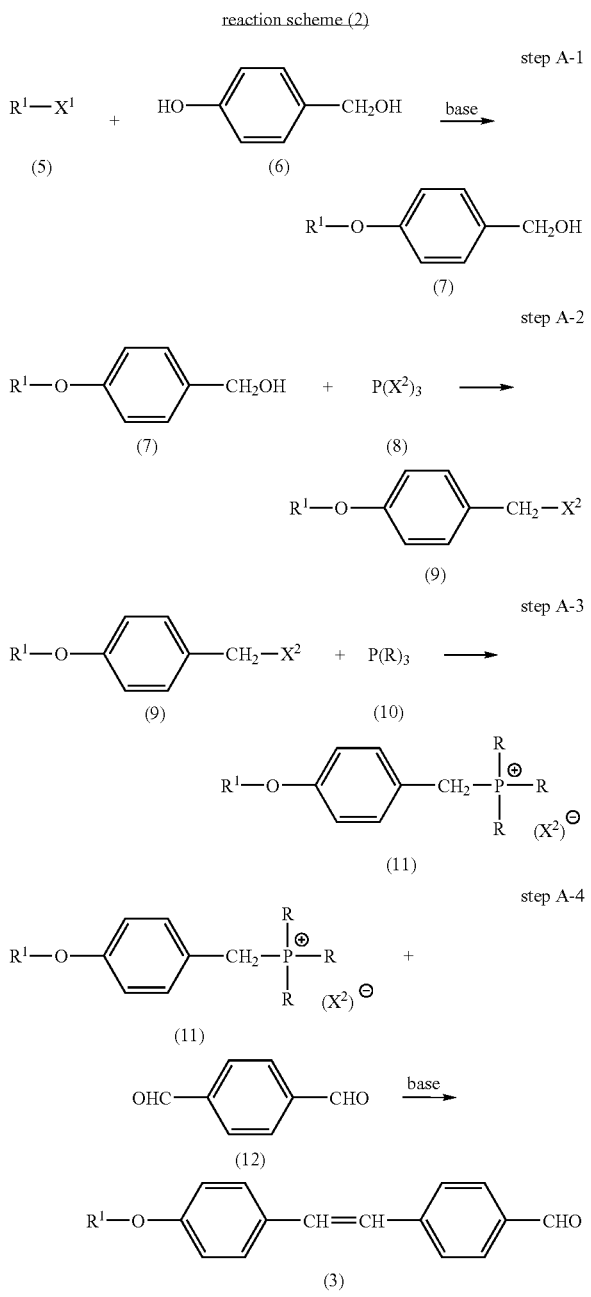

(wherein $R^1$ is the same as above, Rs each represent a monovalent organic group, and $X^1$ and $X^2$ each represent a halogen atom).

Step A-1 is a step of producing a compound represented by general formula (7) by reaction of a halide (compound (5)) with a hydroxybenzyl alcohol (compound (6)) in a solvent in the presence of a base.

$R^1$ in the halide (compound (5)) is a group corresponding to $R^1$ in the benzaldehyde derivative, which is a reaction material used in the first step, represented by general formula (3) and also corresponds to $R^1$ in the benzene derivative having a long, linear conjugated structure represented by general formula (1). $X^1$ represents a halogen atom such as bromine, chlorine, or iodine.

In step A-1, 1 to 3 and preferably 1 to 1.5 moles of the halide (compound (5)) and 1 to 3 and preferably 1 to 1.5 moles of the base, such as sodium hydroxide, potassium hydroxide, sodium ethoxide, or sodium methoxide are used per mole of the hydroxybenzyl alcohol (compound (6)). The reaction is performed in an alcohol solvent, such as methanol or ethanol, at 0° C. to 100° C. and preferably 60° C. to 80° C. for 1 to 20 hours and preferably 5 to 10 hours.

In step A-2, a compound (compound (7)) prepared in step A-1 is allowed to react with a phosphorus halide (compound (8)) in a solvent to prepare a compound represented by general formula (9).

$X^2$ in the phosphorus halide (compound (8)) represents a halogen atom such as bromine, chlorine, or iodine.

In step A-2, 1 to 3 and preferably 1 to 1.5 moles of the phosphorus halide (compound (8)) is used per mole of the compound (compound (7)) prepared in step A-1. The reaction is performed in a solvent, such as ethyl ether, at −30° C. to 60° C. and preferably 0° C. to 30° C. for 1 to 10 hours and preferably 1 to 5 hours.

In step A-3, the compound (compound (9)) prepared in step A-2 is allowed to react with a phosphine compound (compound (10)) in a solvent to prepare a compound represented by general formula (11).

R represents in the phosphine compound (compound (10)) represents a monovalent organic group. The type of R is not limited as long as the compound represented by general formula (9) can be converted into a phosphonium salt. To be specific, for example, a trialkylphosphine, such as triphenylphosphine, trimethylphosphine, or triethylphosphine, may be used.

In step A-3, 1 to 3 and preferably 1 to 1.5 moles of the phosphine compound (compound (10)) is used per mole of the compound (compound (9)) prepared in step A-2. The reaction is performed in a solvent, such as methylene chloride, chloroform, or dichloroethane, at 20° C. to 100° C. and preferably 50° C. to 70° C. for 1 to 10 hours and preferably 3 to 5 hours.

In step A-4, a compound (11) prepared in step A-3 is allowed to react with terephthalaldehyde (compound (12)) in the presence of a base to prepare a benzaldehyde derivative, which is a first reaction material, represented by general formula (3).

In step A-4, 1 to 3 and preferably 1 to 1.5 moles of terephthalaldehyde (compound (12)) and 1 to 5 and preferably 1 to 3 moles of the base, such as sodium hydroxide, potassium hydroxide, sodium ethoxide, or sodium methoxide are used per mole of the compound (compound (11)) prepared in A-3. The reaction is performed in an alcohol solvent, e.g., methanol or ethanol −30° C. to 30° C. and preferably −5° C. to 15° C. for 3 to 15 hours and preferably 5 to 10 hours.

In a production process of the present invention, if necessary, after step A-4, the resulting benzaldehyde derivative (compound (3)) may be heated in a solvent in the presence of iodine.

By the heat treatment, the trans-isomer of the benzaldehyde derivative (compound (3)) can be selectively produced. Subsequently, reaction according to reaction formula (1) can be performed while the trans conformation is maintained. Therefore, the target trans-isomer of the benzene derivative can be selectively produced in high yield.

In this case, 0.001 to 0.1 and preferably 0.005 to 0.01 moles of iodine is added per mole of benzaldehyde derivative (compound (3)). The heating temperature is 100° C. to 180° C. and preferably 130° C. to 150° C. Examples of a solvent that can be used include benzene, toluene, o-xylene, m-xylene, p-xylene, chlorobenzene, o-dichlorobenzene, m-dichlorobenzene, and p-dichlorobenzene. These solvent may be used alone or in combination of two or more.

The other reaction material, i.e., the phosphonium salt represented by general formula (4) can be prepared by, for example, steps B-1 to B-3 according to reaction scheme (3):

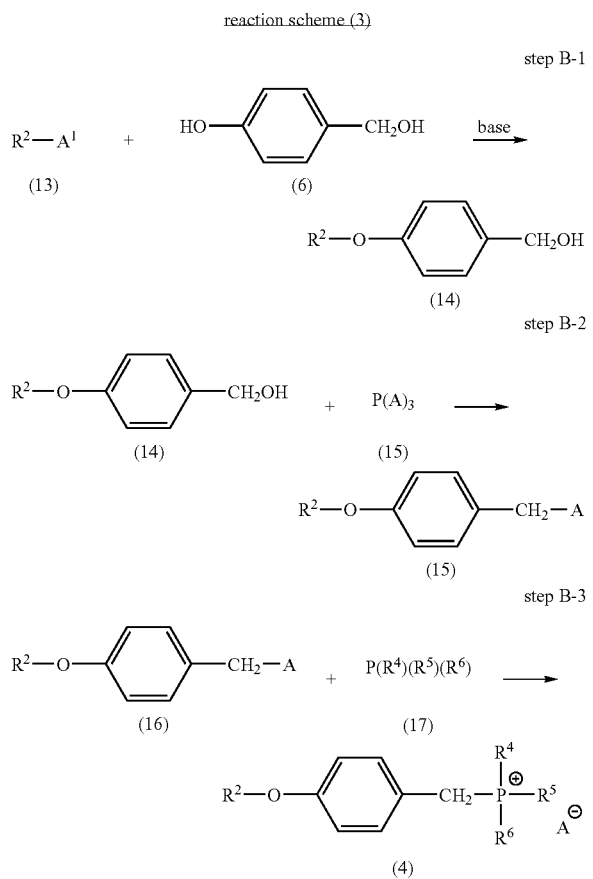

(wherein $R^2$, $R^4$, $R^5$, $R^6$, and A are the same as described above, $A^1$ represents a halogen atom).

In step B-1, a halogenated compound (compound (13)) is allowed to react with a hydroxybenzyl alcohol (compound (6)) in a solvent in the presence of a base to produce a compound represented by general formula (14).

$R^2$ in the halogenated compound (compound (13)) is a group corresponding to $R^2$ in the phosphonium salt, which is a second reaction material, represented by general formula (4) and also corresponds to $R^2$ in the benzene derivative having a long, linear conjugated structure represented by general formula (1). $A^1$ represents a halogen atom such as bromine, chlorine, or iodine.

With respect to the reaction in step B-1, 1 to 3 and preferably 1 to 1.5 moles of the halogenated compound (13) and 1 to 3 and preferably 1 to 1.5 moles of the base, such as sodium hydroxide, potassium hydroxide, sodium ethoxide, or sodium methoxide, are used per mole of hydroxybenzyl alcohol (compound (6)). The reaction is performed in an alcohol solvent, such as methanol or ethanol, at 20° C. to 100° C. and preferably 60° C. to 80° C. for 1 to 15 hours and preferably 5 to 10 hours.

In step B-2, the compound (compound (14)) prepared in step B-1 is allowed to react with a phosphorus halide (compound (15)) in a solvent to produce a compound represented by general formula (16).

A in the phosphorus halide (compound (15)) corresponds to A in the phosphonium salt, which is the second reaction material, represented by general formula (4) and represents a halogen atom such as bromine, chlorine, or iodine.

With respect to the reaction in step B-2, 1 to 3 and preferably 1 to 1.5 moles of the phosphorus halide (compound (15)) is used per mole of the compound (compound (14)) prepared in step B-1. The reaction is performed in a solvent, such as methylene chloride, chloroform, or dichloroethane, at −20° C. to 100° C. and preferably 0° C. to 50° C. for 5 to 20 hours and preferably 5 to 10 hours.

In step B-3, the compound (compound (16)) prepared in step B-2 is allowed to react with a phosphine compound (compound (17)) in a solvent to produce a phosphonium salt represented by general formula (4).

$R^4$, $R^5$, and $R^6$ in the phosphine compound (compound (17)) each represent a monovalent organic group. The types of $R^4$, $R^5$, or $R^6$ are not limited as long as the compound represented by general formula (16) can be converted into a phosphonium salt. Specific examples of the phosphine compound that can be used include trialkylphosphine such as triphenylphosphine, trimethylphosphine, and triethylphosphine.

With respect to the reaction in step B-3, 1 to 3 and preferably 1 to 1.5 moles of the phosphine compound (compound (17)) is used per mole of the compound (compound (16)) prepared in step B-2. The reaction is performed in a solvent, such as chloroform, at 30° C. to 100° C. and preferably 60° C. to 80° C. for 1 to 10 hours and preferably 1 to 5 hours.

A process for producing benzene derivative having a long, linear conjugated structure represented by general formula (1) according to the present invention includes allowing the benzaldehyde derivative represented by general formula (3) to react with the phosphonium salt represented by general formula (4) in a solvent in the presence of a base.

Here, 1 to 3 and preferably 1 to 1.5 moles of the phosphonium salt represented by general formula (4) is added per mole of the benzaldehyde derivative represented by general formula (3).

Examples of the base that can be used include, but are not limited to, metal hydrides such as sodium hydride; amines such as trimethylamine and triethylamine; alkali hydroxides such as potassium hydroxide and sodium hydroxide; alkoxides such as sodium methoxide, potassium methoxide, sodium ethoxide, and potassium ethoxide; and other compounds such as piperidine, pyridine, potassium cresolate, and alkyllithium. These compounds may be used alone or in combination of two or more.

Here, 1 to 4 and preferably 2 to 3 moles of the base is added per mole of the benzaldehyde derivative represented by general formula (3).

Examples of the reaction solvent include ethers such as dioxane, tetrahydrofuran, and dibutyl ether; nitriles such as acetonitrile and propionitrile; alcohols such as methanol and ethanol; and other compounds such as dimethylformamide, acetone, and water. These may be used alone or in combination of two or more.

The term "compound derived from the benzene derivative having a long, linear conjugated structure represented by general formula (1)" (hereinafter, referred to as "polymer") means a homopolymer or copolymer of the benzene derivative; a polymeric compound cross-linked with the benzene derivative using a cross-linking agent; or a polymeric compound prepared by addition reaction of the benzene derivative with a hydrosilyl group-containing polymeric compound, wherein $R^1$ and/or $R^2$ in the benzene derivative having a long, linear conjugated structure represent a group, which is represented by general formula (2), having an unsaturated bond.

For example, when $R^1$ represents a group having an unsaturated bond represented by general formula (2), and $R^2$ represents an alkyl group, an exemplary polymer includes at least a repeating unit represented by general formula (18) or (19):

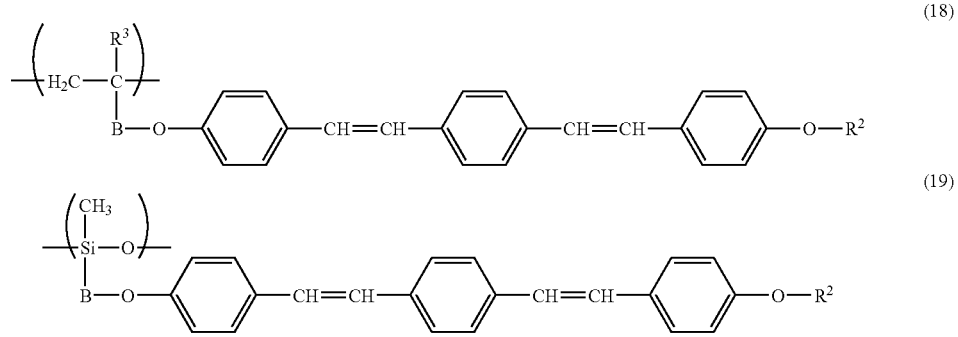

With respect to reaction conditions, the reaction temperature is −20° C. to 50° C. and preferably −5° C. to 25° C. The reaction time is 1 to 20 hours and preferably 5 to 15 hours.

After the reaction, if necessary, purification, such as washing or recrystallization, is performed to produce a benzene derivative having a long, linear conjugated structure represented by general formula (1).

In the present invention, the resulting benzene derivative having a long, linear conjugated structure represented by general formula (1) may be heated in a solvent in the presence of iodine.

By the heat treatment, the trans-isomer of the benzene derivative having a long, linear conjugated structure represented by general formula (1) can be selectively produced.

In this case, 0.001 to 0.1 and preferably 0.005 to 0.01 moles of iodine is added per mole of the benzene derivative having a long, linear conjugated structure represented by general formula (1). The heating temperature is 100° C. to 180° C. and preferably 130° C. to 150° C. Examples of a solvent that can be used include benzene, toluene, o-xylene, m-xylene, p-xylene, chlorobenzene, o-dichlorobenzene, m-dichlorobenzene, and p-dichlorobenzene. These solvents may be used alone or in combination of two or more.

The resulting benzene derivative having a long, linear conjugated structure represented by general formula (1) is a novel liquid-crystalline compound.

Next, the liquid-crystal material according to the present invention will be described.

The liquid-crystal material according to the present invention includes the benzene derivative having a long, linear conjugated structure represented by general formula (1) or a compound derived from the benzene derivative having a long, linear conjugated structure.

(wherein $R^3$ and B are the same as described above, and $R^2$ represents an alkyl group).

The polymer may include a repeating unit, which is a copolymer component, derived from, for example, acrylic acid, methacrylic acid, or styrene. When the polymer is a copolymer, the content of the repeating unit represented by general formula (18) or (19) is, for example, 50 mole percent or more, preferably 70 mole percent or more, and most preferably 80 mole percent or more.

The number-average molecular weight of the polymer is in the range of 1000 to tens of millions and preferably tens of thousands to millions.

The polymer can be produced by the following method. For example, in order to produce a homopolymer or copolymer of the compound represented by general formula (18) or a polymeric compound cross-linked with the compound using a cross-linking agent, either a predetermined monomer alone or a mixture of a predetermined monomer with a cross-linking agent may be polymerized in the presence of a polymerization initiator by radical polymerization such as solution polymerization, suspension polymerization, emulsion polymerization, or bulk polymerization.

Furthermore, in order to produce a polymeric compound by addition reaction of a hydrosilyl group-containing polymeric compound with the benzene derivative having a long, linear conjugated structure represented by general formula (19), the hydrosilyl group-containing polymeric compound is allowed to react with the benzene derivative having a long, linear conjugated structure represented by general formula (1) in the presence of platonic chloride, a platonic chloride alcohol solution, a complex of platinum and an olefin complex, or a rhodium catalyst such as a rhodium carbonyl complex.

The liquid-crystal material according to the present invention is a material exhibiting smectic liquid crystallinity and including the benzene derivative having a long, linear conjugated structure represented by general formula (1), a composition containing the benzene derivative having a long, linear conjugated structure, the above-described polymer, or a composition containing the polymer.

In the composition containing the benzene-derivative having a long, linear conjugated structure represented by general formula (1), the content of the benzene derivative having a long, linear conjugated structure represented by general formula (1) is at least 30 percent by weight or more, preferably 50 percent by weight or more, and most preferably 90 percent by weight or more. Furthermore, the composition exhibits smectic liquid crystallinity due to the liquid-crystalline compound having a long, linear conjugated structure represented by general formula (1).

The other components in the composition are used for adjusting the phase transition temperature of the benzene derivative having a long, linear conjugated structure represented by general formula (1). For example, other liquid-crystalline compounds or other compounds each having a long, linear conjugated structure and having an alkyl group or an alkoxide group at its ends may be used alone or in combination of two or more. The other compounds each having a long, linear conjugated structure and having an alkyl group or an alkoxide group at its ends may be a liquid-crystalline compound or not. These other components may be used alone or in combination of two or more.

The composition containing the benzene derivative having a long, linear conjugated structure represented by general formula (1) can be prepared as follows: the benzene derivative having a long, linear conjugated structure represented by general formula (1) and a predetermined component described above are dissolved in a solvent, and then the solvent is removed by heating, under a reduced pressure, or the like; the benzene derivative having a long, linear conjugated structure represented by general formula (1) and a predetermined component described above are mixed and melted by heating; or sputtering, vacuum evaporation, or the like.

In the composition containing the polymer, the content of the polymer is at least 30 percent by weight or more, preferably 50 percent by weight or more, and most preferably 80 percent by weight or more. Furthermore, the composition exhibits smectic liquid crystallinity due to the liquid-crystalline compound, i.e., the benzene derivative, having a long, linear conjugated structure represented by general formula (1).

The other components in the composition are used for adjusting the phase transition temperature of the polymer. For example, other liquid-crystalline compounds or other compounds each having a long, linear conjugated structure and having an alkyl group or an alkoxide group at its ends may be used alone or in combination of two or more. The other compounds each having a long, linear conjugated structure and having an alkyl group or an alkoxide group at its ends may be a liquid-crystalline compound or not. These other components may be used alone or in combination of two or more.

The composition containing the polymer can be prepared as follows: the polymer and a predetermined component described above are dissolved in a solvent, and then the solvent is removed by heating, under a reduced pressure, or the like; the polymer and a predetermined component described above are mixed and melted by heating; or sputtering, vacuum evaporation, or the like.

The liquid-crystal material according to the present invention can be used as a charge-transport material capable of transporting charge by applying a voltage to the liquid-crystal material in a liquid-crystalline state or in a solid state due to phase transition of the liquid-crystalline state, and can be used for a charge-transport material used in, for example, optical sensors, organic electroluminescent elements (EL elements), photoconductors, spatial modulators, thin-film transistors, charge-transport substances for electrophotographic photoreceptors, photolithographic materials, solar cells, nonlinear optical materials, organic semiconductor capacitors, or other sensors.

EXAMPLES

While the present invention will be described in detail based on examples below, it is understood that the invention is not limited thereto.

Synthetic Example

1. Preparation of Benzaldehyde Derivative Used as First Reaction Material

Synthetic Example 1-1

Synthesis of 10-bromo-1-decene (Compound (22))

According to reaction formula (4), 10-bromo-1-decene (compound (22)) was synthesized.

reaction formula (4)

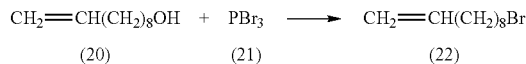

First, 24.67 g (0.15 M) of 9-decene-lol (compound (20)) was dissolved in 180 mL of diethyl ether. The system was purged with nitrogen and cooled in ice. At a solution temperature of 5° C. or less, 22.56 g (0.075 M) of phosphorus tribromide (compound (21)) was added dropwise thereto. After dropwise addition, stirring was performed at 15° C. for 17 hours. The resulting solution was cooled in ice. At a solution temperature of 5° C. or less, 95 mL of methanol was added dropwise. After the dropwise addition, 190 g of a sodium hydrogen carbonate aqueous solution (1 M) was added dropwise, and then stirring was stopped. Next, phase separation was performed. The separated organic layer was washed with 105 g of saturated brine. The resulting organic layer was concentrated and distilled (85° C., 1.8 mmHg) to produce 18.83 g of a target 10-bromo-1-decene (compound (22)) (yield: 57.2%).

<Identification Data>
$^1$H-NMR (δ, CDCl$_3$): 1.2-1.5 (m, 10H, —(CH$_2$)$_5$—), 1.8-1.9 (m, 2H, —CH$_2$—), 2.0-2.1 (m, 2H, —CH$_2$—), 3.4 (t, 2H, —CH$_2$Br), 4.9-5.0 (m, 2H, CH$_2$=), 5.7-5.9 (m, 1H, =CH—).

Synthetic Example 1-2

Synthesis of 9-decenoxybenzyl Alcohol (Compound (23))

According to reaction formula (5), 9-decenoxybenzyl alcohol (compound (23)) was synthesized.

reaction formula (5)

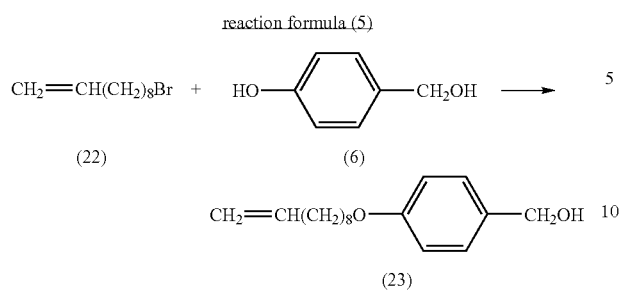

First, 12.80 g (0.10 M) of 4-hydroxybenzyl alcohol (compound (6)) was dissolved in 190 mL of ethanol, and 4.0 g (0.10 M) of sodium hydroxide was added thereto. The resulting mixture was heated to 65° C. After heating, 24.14 g (0.11 M) of 10-bromo-1-decene (compound (22)) prepared in Synthetic example 1-1 was added dropwise, and the resulting mixture was aged at a mixture temperature of 760° C. for 6 hours. Next, the generated salt was removed by decantation, and the reaction solution was concentrated. After concentration, the resulting solution was diluted with 350 mL of diethyl ether and washed twice with 100 mL of deionized water. After washing, the organic layer was concentrated to produce crude crystals. The crude crystals were recrystallized twice from 25 mL of hexane. The recrystallized crystals were washed with hexane and dried. Thereby, 16.88 g of 9-decenoxybenzyl alcohol (compound (23)) was produced (yield: 64.3%).

<Identification Data>
$^1$H-NMR ($\delta$, CDCl$_3$): 1.3-1.6 (m, 10H, —(CH$_2$)$_5$—), 1.7-1.8 (m, 2H, —CH$_2$—), 2.0-2.1 (m, 2H, —CH$_2$—), 3.9 (t, 2H, —CH$_2$O—), 4.6 (d, 2H, —CH$_2$OH), 4.9-5.0 (m, 2H, CH$_2$=), 5.7-5.9 (m, 1H, =CH—), 6.8-6.9 .(m, 2H, —OPh—), 7.2-7.3 (m, 2H, —PhCH$_2$—).
FAB-MASS (Xe): 263 (MH+).

Synthetic Example 1-3

Synthesis of 9-decenoxybenzyl Bromide (Compound (24))

According to reaction formula (6), 9-decenoxybenzyl bromide (compound (24)) was synthesized.

reaction formula (6)

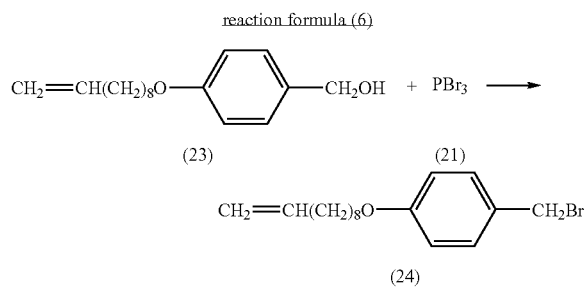

First, 16.05 g (0.061 M) of 9-decenoxybenzyl alcohol (compound (23)) prepared in Synthetic example 1-2 was dissolved in 85 mL of diethyl ether, and the solution was cooled to 0° C. After cooling, 6.76 g (0.022 M) of phosphorus tribromide (compound (21)) was added dropwise thereto at 5° C. or less. The mixture was aged at 5° C. for 2 hours and then at 15° C. for 1.5 hours. After aging, the solution was cooled to 50° C. Then, 38 mL of methanol was added dropwise at 50° C. or less. After dropwise addition, 73.4 g of a sodium hydrogen carbonate aqueous solution (1 M) was added dropwise at 10° C. or less, and then phase separation was performed. After the separation, the separated organic layer was washed with 32 mL of deionized water and then concentrated. Thereby, 18.19 g of 9-decenoxybenzyl bromide (compound (24)) was produced (yield: 91.6%).

<Identification Data>
$^1$H-NMR ($\delta$, CDCl$_3$): 1.3-1.5 (m, 10H, —(CH$_2$)$_5$—), 1.7-1.8 (m, 2H, —CH$_2$—), 2.0-2.1 (m, 2H, —CH$_2$—), 3.9 (t, 2H, —CH$_2$O—), 4.5 (s, 2H, —CH$_2$Br), 4.9-5.0 (m, 2H, CH$_2$=), 5.7-5.9 (m, 1H, =CH—), 6.8-6.9 (m, 2H, —OPh—), 7.2-7.3 (m, 2H, —PhCH$_2$—).
FAB-MASS (Xe): 325 (M+).

Synthetic Example 1-4

Synthesis of 9-decenoxybenzyltriphenylphosphonium Bromide (Compound (26))

According to reaction formula (7), 9-decenoxybenzyltriphenylphosphonium bromide (compound (26)) was synthesized.

reaction formula (7)

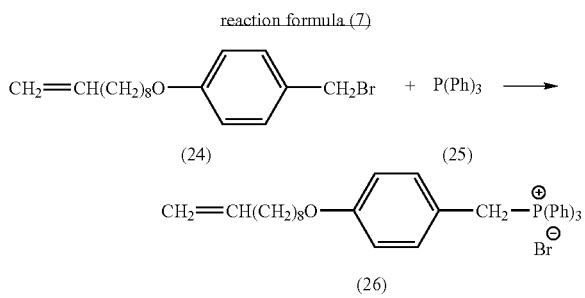

First, 17.23 g (0.053 M) of 9-decenoxybenzyl bromide (compound (24)) prepared in Synthetic example 1-3 and 13.92 g (0.053 M) of triphenylphosphine (compound (25)) were added to 53 mL of chloroform. The resulting mixture was heated to 60° C. and then aged for 1.5 hours. After aging, the resulting reaction mixture was concentrated to produce crude crystals. The resulting crude crystals were washed with diethyl ether, filtrated, and dried. Thereby, 29.19 g of 9-decenoxybenzyltriphenylphosphonium bromide (compound (26)) was produced (yield: 93.7%).

<Identification Data>
$^1$H-NMR ($\delta$, CDCl$_3$): 1.3-1.5 (m, 10H, —(CH$_2$)$_5$—), 1.7-1.8 (m, 2H, —CH$_2$—), 2.0-2.1 (m, 2H, —CH$_2$—), 3.8 (t, 2H, —CH$_2$O—), 4.9-5.0 (m, 2H, —CH$_2$=), 5.2 (d, 2H, —CH$_2$P—), 5.7-5.9 (m, 1H, =CH—), 5.2 (d, 2H, —CH$_2$P—), 6.6 (d, 2H, —OPh—), 7.0 (dd, 2H, —PhCH$_2$—), 7.6-7.8 (m, 15H, (Ph)$_3$).
$^{31}$P-NMR ($\delta$, CDCl$_3$): 28.0 ppm.
FAB-MASS (Xe): 507 (M-Br). Synthetic example 1-5: Synthesis of 9-decenoxystilbene aldehyde (compound (27))

According to reaction formula (8), 9-decenoxystilbene aldehyde (compound (27)) was synthesized.

reaction formula (8)

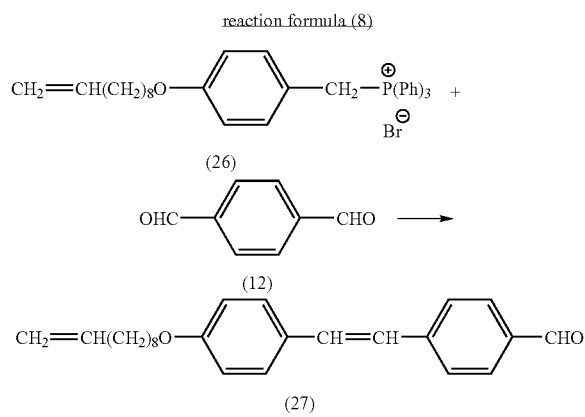

First, 23.07 g (0.039 M) of 9-decenoxybenzyltriphenylphosphonium bromide (compound (26)) prepared in Synthetic example 1-4 and 5.91 g of terephthalaldehyde (compound (12)) were dissolved in 315 mL of ethanol. The resulting solution was cooled to −2° C., and then 25.64 g of a sodium ethoxide ethanol solution (21 percent by weight, aldrich) was added dropwise at 0° C. or less. Aging was performed at a mixture temperature of 0° C. or less for 1.5 hours and then at a mixture temperature of 10° C. to 15° C. for 2 hours. After aging, 39 g of deionized water was added dropwise. Then, the precipitated crystals were filtrated and washed with 50 mL of 60% aqueous ethanol and 30 mL of ethanol, followed by drying. Thereby, 7.12 g of 9-decenoxystilbene aldehyde (compound (27)) was produced (yield: 50.0%).

<Identification Data>
$^1$H-NMR (δ, CDCl$_3$): 1.3-1.5 (m, 10H, —(CH$_2$)$_5$—), 1.7-1.8 (m, 2H, —CH$_2$—), 2.0-2.1 (m, 2H, —CH$_2$—), 3.9-4.0 (m, 2H, —CH$_2$O—), 4.9-5.0 (m, 2H, —CH$_2$=), 5.7-5.9 (m, 1H, =CH—), 6.5-7.9 (m, 10H, Ph, —CH=CH—).
FAB-MASS (Xe): 363 (MH+).

2. Preparation of phosphonium salt used as second reaction material

Synthetic Example 2-1

Synthesis of octanoxybenzyl Alcohol (Compound (29))

According to reaction formula (9), octanoxybenzyl alcohol (compound (29)) was synthesized.

reaction formula (9)

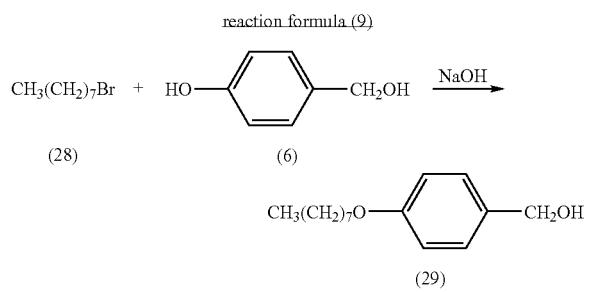

First, 12.80 g (0.10 M) of 4-hydroxybenzyl alcohol (compound (6)) was dissolved in ethanol 190 mL, and 4.0 g (0.10 M) of sodium hydroxide was added thereto. The resulting mixture was heated to 65° C. After heating, 21.24 g (0.11 M) of prepared 1-bromooctane (compound (28)) was added dropwise, and the resulting mixture was aged at a mixture temperature of 76° C. for 6 hours. Next, the generated salt was removed by decantation, and the reaction solution was concentrated. After concentration, the resulting solution was diluted with 350 mL of diethyl ether and washed twice with 100 mL of deionized water. After washing, the organic layer was concentrated to produce crude crystals. The crude crystals were recrystallized from hexane. The recrystallized crystals were washed with hexane and dried. Thereby, 15.88 g of octanoxybenzyl alcohol (compound (29)) was produced (yield: 67.2%). Synthetic example 2-2: Synthesis of octanoxybenzyl bromide (compound (30))

According to reaction formula (10), octanoxybenzyl bromide (compound (30)) was synthesized.

reaction formula (10)

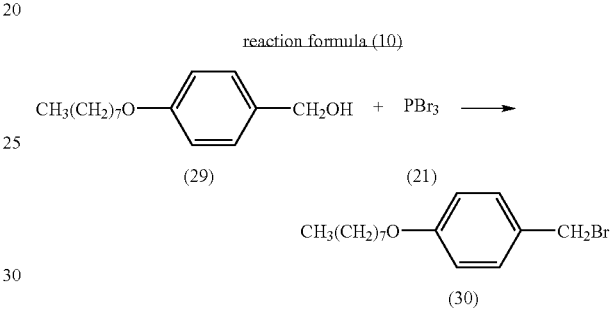

First, 14.41 g (0.061 M) of octanoxybenzyl alcohol (compound (29)) prepared in Synthetic example 2-1 was dissolved in 85 mL of diethyl ether, and the solution was cooled to 0° C. After cooling, 6.76 g (0.022 M) of phosphorus tribromide (compound (21)) was added dropwise thereto at 5° C. or less. The mixture was aged at 5° C. for 2 hours and then at 15° C. for 1.5 hours. After aging, the solution was cooled to 5° C. Then, 38 mL of methanol was added dropwise at 5° C. or less. After dropwise addition, 73.4 g of a sodium hydrogen carbonate aqueous solution (1 M) was added dropwise at 10° C. or less, and then phase separation was performed. After the separation, the separated organic layer was washed with 32 mL of deionized water and then concentrated. Thereby, 16.15 g of octanoxybenzyl bromide (compound (30)) was produced (yield: 93.5%).

Synthetic Example 2-3

Synthesis of octanoxybenzyltriphenylphosphonium Bromide (Compound (31))

According to reaction formula (11), octanoxybenzyltriphenylphosphonium bromide (compound (31)) was synthesized.

reaction formula (11)

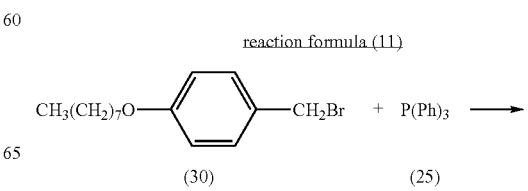

-continued

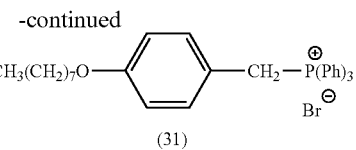

First, 15.01 g (0.053 M) of octanoxybenzyl bromide (compound (30)) prepared in Synthetic example 2-2 and 13.92 g (0.053M) of triphenylphosphine (compound (25)) were added to 53 mL of chloroform. The resulting mixture was heated to 60° C. and then aged for 1.5 hours. After aging, the resulting reaction mixture was concentrated to produce crude crystals. The resulting crude crystals were washed with diethyl ether, filtrated, and dried. Thereby, 29.45 g of octanoxybenzyltriphenylphosphonium bromide (compound (31)) was produced (yield: 94.9%).

Example 1

According to reaction formula (12), a benzene derivative (compound (32)) was synthesized.

performed at 50° C. for 24 hours. The resulting mixture was filtrated to produce crystals. The resulting crude crystals were washed with 60% aqueous ethanol and diethyl ether, followed by drying. Thereby, 1.58 g of a distyrylbenzene derivative (compound (32)) was produced (yield: 63.9%).

<Identification Data>

$^1$H-NMR ($\delta$, $CDCl_3$): 0.9 (m, 3H, —$CH_3$), 1.3-2.1 (m, 26H, —$(CH_2)_7$—, —$(CH_2)_6$—), 4.0 (m, 4H, —$CH_2O$—), 4.9-5.0 (m, 2H, $CH_2$=), 5.8-5.9 (m, 1H, =CH—), 6.5-7.5 (m, 16H, Ph)

MASS (DIEI): 564 (M+).

IR (KBr, cm-1): 3,080-3,020 (aromatic C-H stretching vibration), 2,921-2,850 (aliphatic C—H stretching vibration), 1,604 (C=C stretching vibration), 1,254 (C—O—C antisymmetric stretching vibration), 1,024 (C—O—C symmetric stretching vibration), 837-827 (aromatic C—H in-plane deformation vibration).

CHN elementary analysis

Theoretical value $C_,$: 85.05%; $H_,$: 9.28%; $N_,$: 0%;.

Measured value $C_,$: 85.06%; $H_,$: 9.30%; $N_,$: 0%;.

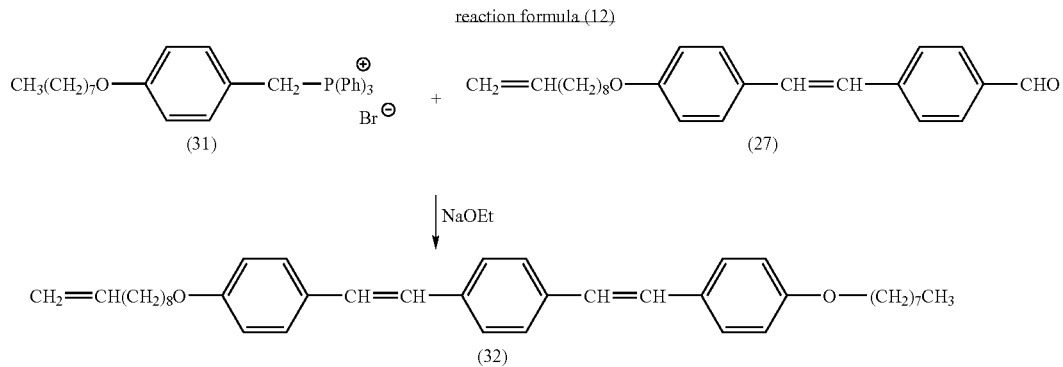

First, 2.57 g (0.0044 M) of octanoxybenzyltriphenylphosphonium bromide (compound (31)) prepared in Synthetic example 2-3 and 1.59 g (0.0044 M) of 9-decenoxystilbene aldehyde (compound (27)) prepared in Synthetic example 1-5 were dissolved in 20 mL of methanol, and 4.29 g of a sodium ethoxide ethanol solution (21 percent by weight, aldrich) was added dropwise thereto. After dropwise addition, aging was

Example 2

A phosphonium salt (compound (34)) was prepared by the reaction according to Synthetic examples 2-1 to 2-3, provided that 1-bromononane was used instead of 1-bromooctane.

Subsequently, according to reaction formula (13):

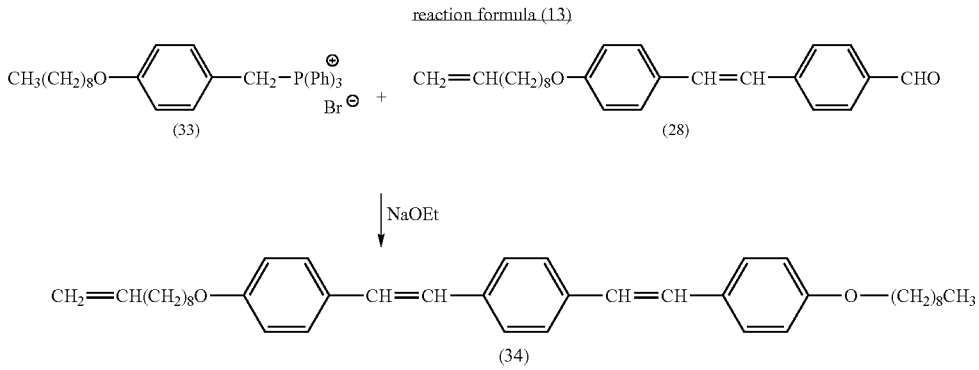

the resulting phosphonium salt (compound (33)) was allowed to react with 9-decenoxystilbene aldehyde (compound (27)), which was prepared in Synthetic example 1-5, as in EXAMPLE 1 to produce a benzene derivative (compound (34)).

<Identification Data>
$^1$H-NMR ($\delta$, CDCl$_3$): 0.9 (m, 3H, —CH$_3$), 1.3-2.1 (m, 30H, —(CH$_2$)$_7$—, —(CH$_2$)$_8$—), 4.0 (m, 4H, —CH$_2$O—), 4.9-5.0 (m, 2H, CH$_2$=), 5.8-5.9 (m, 1H, =CH—), 6.5-7.5 (m, 16H, Ph).
MASS (DIEI): 592 (M+).
IR (KBr, cm-1): 3,080-3,020 (aromatic C—H stretching vibration), 2,921-2,850 (aliphatic C—H stretching vibration), 1,604 (C=C stretching vibration), 1,254 (C—O—C antisymmetric stretching vibration), 1,024 (C—O—C symmetric stretching vibration), 837-827 (aromatic C—H in-plane deformation vibration).
CHN elementary analysis
　Theoretical value C,: 85.08%; H,: 9.52%; N,: 0%;
　Measured value C,: 85.11%; H,: 9.44%; N,: 0%;

Example 3

A phosphonium salt was prepared by the reaction according to Synthetic examples 2-1 to 2-3, provided that 1-bromoundecane was used instead of 1-bromooctane.

Subsequently, according to reaction formula (14):

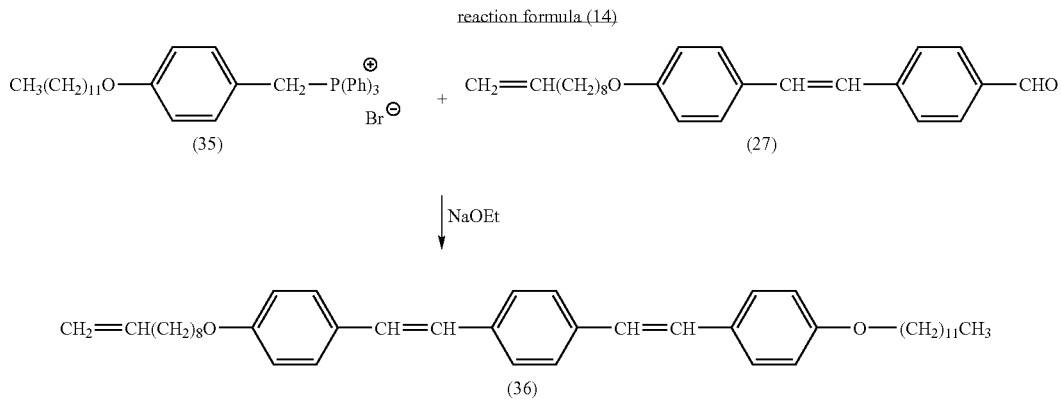

the resulting phosphonium salt (compound (35)) was allowed to react with 9-decenoxystilbene aldehyde (compound (27)), which was prepared in Synthetic example 1-5, as in EXAMPLE 1 to produce a benzene derivative (compound (36)).

<Identification data>
$^1$H-NMR ($\delta$, CDCl$_3$): 0.9 (m, 3H, —CH$_3$), 1.3-2.1 (m, 30H, —(CH$_2$)$_7$—, —(CH$_2$)$_8$—), 4.0 (m, 4H, —CH$_2$O—), 4.9-5.0 (m, 2H, CH$_2$=), 5.8-5.9 (m, 1H, =CH—), 6.5-7.5 (m, 16H, Ph).
IR (KBr, cm-1): 3,080-3,020 (aromatic C—H stretching vibration), 2,921-2,850 (aliphatic C—H stretching vibration), 1,604 (C=C stretching vibration), 1,254 (C—O—C antisymmetric stretching vibration), 1,024 (C—O—C symmetric stretching vibration), 837-827 (aromatic C—H in-plane deformation vibration).
CHN elementary analysis
　Theoretical value C,: 85.11%; H,: 9.74%; N,: 0%;.
　Measured value C,: 85.00%; H,: 9.80%; N,: 0%;.

Furthermore, the benzene derivatives prepared in EXAMPLES 1 to 3 were analyzed by X-ray diffraction, and the textures of the benzene derivatives were observed with a polarizing microscope. The results indicated phase transitions as shown in Table 1.

TABLE 1

| | Phase transition | | | | | | |
|---|---|---|---|---|---|---|---|
| EXAMPLE 1 | Cyst | 95° C. ⇌ | SmG | 188° C. ⇌ | SmB | 253° C. ⇌ | Iso |
| EXAMPLE 2 | Cyst | 105° C. ⇌ | SmG | 185° C. ⇌ | SmB | 240° C. ⇌ | Iso |
| EXAMPLE 3 | Cyst | 104° C. ⇌ | SmG | 176° C. ⇌ | SmB | 241° C. ⇌ | Iso |

Cyst: crystal,
SmG smectic-G phase,
SmB: smectic-B phase,
Iso: isotropic liquid

INDUSTRIAL APPLICABILITY

As has been described above, an inventive benzene derivative having a long, linear conjugated structure represented by general formula (1) is a novel compound. The benzene derivative having a long, linear conjugated structure is a compound having smectic liquid crystallinity. A liquid-crystal material containing the benzene derivative having a long, linear conjugated structure or a compound derived from the derivative can be used as a charge-transport material capable of transporting charge by applying a voltage to the liquid-crystal material in a liquid-crystalline state or in a solid state due to phase transition of the liquid-crystalline state, and can be used for a charge-transport material used in, for example, optical sensors, organic electroluminescent elements (EL elements), photoconductors, spatial modulators, thin-film transistors, charge-transport substances for electrophotographic photoreceptors, photolithographic materials, solar cells, nonlinear optical materials, organic semiconductor capacitors, or other sensors.

The invention claimed is:

1. A benzene derivative having a long, linear conjugated structure represented by general formula (1):

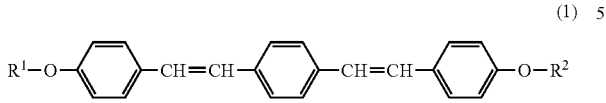 (1)

wherein $R^1$ and $R^2$ each represent a straight or branched alkyl group, an alkoxy group, or a group having an unsaturated bond represented by general formula (2):

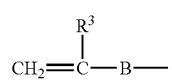 (2)

(wherein $R^3$ represents a hydrogen atom or a methyl group, and B represents an alkylene group, —CO—O—$(CH_2)_n$— (n is a natural number), —$C_6H_4$—$CH_2$— ($C_6H_4$ is a phenyl ring), or —CO—), with the proviso that $R^1$ and $R^2$ are not the same group.

2. A process for producing a benzene derivative having a long, linear conjugated structure represented by general formula (1):

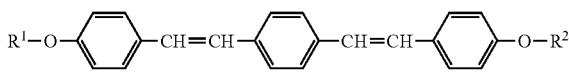 (1)

(wherein $R^1$ and $R^2$ are the same as described above, with the proviso that $R^1$ and $R^2$ are not the same group), the process comprising: allowing a benzaldehyde derivative represented by general formula (3):

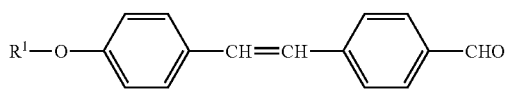 (3)

(wherein $R^1$ is the same as described above) to react with a phosphonium salt represented by (4):

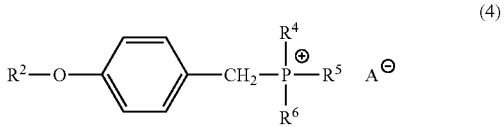 (4)

(wherein $R^2$ is the same as described above, $R^4$, $R^5$, and $R^6$ are each a monovalent organic group, and A represents a halogen atom), in the presence of a base.

3. A liquid-crystal material comprising: a benzene derivative having a long, linear conjugated structure represented by general formula (1):

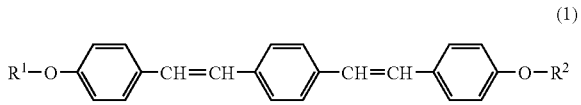 (1)

wherein $R^1$ and $R^2$ each represent a straight or branched alkyl group, an alkoxy group, or a group having an unsaturated bond represented by general formula (2):

 (2)

(wherein $R^3$ represents a hydrogen atom or a methyl group, and B represents an alkylene group, —CO—O—$(CH_2)_n$— (n is a natural number), —$C_6H_4$—$_2$— ($C_6H_4$ is a phenyl ring), or —CO—), with the proviso that $R^1$ and $R^2$ are not the same group; or a compound derived from the benzene derivative.

* * * * *